(12) United States Patent
Lim et al.

(10) Patent No.: US 11,351,743 B2
(45) Date of Patent: Jun. 7, 2022

(54) CO-CONSOLIDATION OF THERMOPLASTIC PARTS

(71) Applicant: The Boeing Company, Chicago, IL (US)

(72) Inventors: Blair Alexandra Lim, Seattle, WA (US); Young Zeon, Edmonds, WA (US); Gerfried Rudolf Achtner, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 856 days.

(21) Appl. No.: 16/043,775

(22) Filed: Jul. 24, 2018

(65) Prior Publication Data
US 2020/0031060 A1    Jan. 30, 2020

(51) Int. Cl.
*B29C 65/00* (2006.01)
*B29C 70/44* (2006.01)
*B29L 31/30* (2006.01)
*B29K 71/00* (2006.01)

(52) U.S. Cl.
CPC .... *B29C 66/73921* (2013.01); *B29C 66/1142* (2013.01); *B29C 66/43* (2013.01); *B29C 66/721* (2013.01); *B29C 66/73776* (2013.01); *B29C 70/44* (2013.01); *B29K 2071/00* (2013.01); *B29L 2031/3076* (2013.01)

(58) Field of Classification Search
CPC ................................ B29C 66/40; B29C 66/43
See application file for complete search history.

(56) References Cited

U.S. PATENT DOCUMENTS

| | | | |
|---|---|---|---|
| 3,821,051 A | 6/1974 | Withers | |
| 4,904,436 A | 2/1990 | Rachal | |
| 5,108,532 A * | 4/1992 | Thein | B29C 43/203 |
| | | | 156/285 |
| 5,116,216 A * | 5/1992 | Cochran | B29C 70/44 |
| | | | 156/286 |
| 5,264,011 A * | 11/1993 | Brown | B23K 35/327 |
| | | | 51/309 |

(Continued)

FOREIGN PATENT DOCUMENTS

| | | |
|---|---|---|
| EP | 2416946 A2 | 2/2012 |
| JP | 2003176403 A * | 6/2003 |

(Continued)

OTHER PUBLICATIONS

Ijaz et al. Cooling and crystallization behavior during vacuum-consolidation of commingled thermoplastic composites. Composites: Part A 38 (2007) pp. 828-842.retrieved from Science Direct. (Year: 2007).*

(Continued)

*Primary Examiner* — Cachet I Proctor
(74) *Attorney, Agent, or Firm* — Duft & Bornsen, PC

(57) ABSTRACT

Systems and methods are provided for consolidating thermoplastic parts. One embodiment is a method of automatically forming a thermoplastic composite structure. The method includes heating a thermoplastic preform to a forming temperature, forming the thermoplastic preform into a thermoplastic part having a desired shape, aligning multiple thermoplastic parts together, and consolidating the multiple thermoplastic parts together while controlling crystallization to form a complex thermoplastic part.

20 Claims, 10 Drawing Sheets

(56) References Cited

U.S. PATENT DOCUMENTS

| | | | |
|---|---|---|---|
| 6,565,942 B2* | 5/2003 | Anderson | B29C 65/5042 |
| | | | 428/116 |
| 7,479,201 B1 | 1/2009 | Wegner et al. | |
| 8,329,085 B2 | 12/2012 | Kurtz et al. | |
| 9,314,975 B1* | 4/2016 | Matsen | B29C 70/46 |
| 2004/0222562 A1* | 11/2004 | Kirchner | B29C 43/3642 |
| | | | 264/314 |
| 2008/0280118 A1* | 11/2008 | Fujimoto | B29C 48/08 |
| | | | 428/219 |
| 2011/0052130 A1* | 3/2011 | Yoshitake | B29C 66/1122 |
| | | | 385/130 |
| 2011/0256406 A1* | 10/2011 | Farrell | B29C 66/71 |
| | | | 428/412 |
| 2015/0014484 A1* | 1/2015 | Zeon | B64C 1/26 |
| | | | 244/131 |
| 2018/0229452 A1* | 8/2018 | Ogale | B29C 66/73115 |
| 2019/0352500 A1* | 11/2019 | Seidel | C08L 69/00 |

FOREIGN PATENT DOCUMENTS

| | | | |
|---|---|---|---|
| WO | 2010115853 A2 | 10/2010 | |
| WO | WO-2010115853 A2 * | 10/2010 | B64C 1/12 |

OTHER PUBLICATIONS

GCC Examination Report; Application GC2019-37967; dated Mar. 3, 2021.

Consolidation-ThermoPlastic composites Research Center; https://tprc.nl/research-overview/consolidation-thermoplastics; May 11, 2018.

Ginger Gardiner; Consolidating thermoplastic composite aerostructures in place, Part 1; Jan. 29, 2018; https://www.compositesworld.com/articles/consolidating-thermoplastic-composite.

GC Examination Report; Application GC2019-37967; dated Jul. 6, 2021.

GC Examination Report; Application GC 2019-37967; dated Nov. 25, 2021.

* cited by examiner

CO-CONSOLIDATION OF THERMOPLASTIC PARTS

FIELD

The disclosure relates to the field of composite fabrication, and in particular, to thermoplastic parts.

BACKGROUND

Typically, reinforced structures for aircraft such as ribs, spars and frames are fabricated from complex layups on complex tooling from thermoset materials. These types of layups are costly in that they may require substantial amounts of labor as well as tooling. Thermoset layups have disadvantages, particularly prepreg thermoset materials, which have to be laid up on a mandrel via tape laying machinery and then processed to cure. Thermoset materials are expensive to purchase and maintain. Furthermore, thermoset processing typically requires pressure and heating provided via an autoclave.

Complex composite parts (e.g., portions of an airframe that have a large number of projecting features such as walls or flanges) may be substantially more difficult to fabricate than simple composite parts. For example, tooling that defines a complex composite part including walls or flanges may have a surface geometry that is expensive to fabricate or to maintain. Furthermore, layup techniques for complex composite parts may be particularly labor intensive, because shaping composite material into a shape for a complex composite part may be time consuming or labor intensive. These aspects of fabrication make complex composite parts less desirable, in spite of the potentially enhanced strength provided by complex composite parts Therefore, it would be desirable to have a method and apparatus that take into account at least some of the issues discussed above, as well as other possible issues.

SUMMARY

Embodiments described herein provide techniques for co-consolidating thermoplastic parts together via the application of heat and pressure to thermoplastic parts that are held adjacent, and further cool the co-consolidated thermoplastic parts together to a crystallization temperature wherein portions of those thermoplastic parts form an integral crystal structure. This process allows thermoplastic parts to be fabricated at reduced complexity, and then co-consolidated via a heated die in order to form more complex composite parts.

One embodiment is a method of automatically forming a thermoplastic composite structure. The method includes heating a thermoplastic preform to a forming temperature, forming the thermoplastic preform into a thermoplastic part having a desired shape, aligning multiple thermoplastic parts together, and consolidating the multiple thermoplastic parts together while controlling crystallization to form a complex thermoplastic part.

A further embodiment is a method for co-consolidating thermoplastic parts. The method includes melting a first resin in a first thermoplastic part defining a first surface and melting a second resin in a second thermoplastic part defining a second surface, pressing the first surface into the second surface, cooling the first surface and the second surface to a crystallization temperature, and forming the first resin and the second resin into an integral crystal structure.

Another embodiment is a non-transitory computer readable medium embodying programmed instructions which, when executed by a processor, are operable for performing a method. The method includes melting a first resin in a first thermoplastic part defining a first surface and melting a second resin in a second thermoplastic part defining a second surface, pressing the first surface into the second surface, cooling the first surface and the second surface to a crystallization temperature, and forming the first resin and the second resin into an integral crystal structure.

Still another embodiment is a system for stamp forming thermoplastic parts. The system includes a stamping system having a die, a mandrel, and an actuator that displaces the die to stamp a sheet of fiber reinforced thermoplastic material into a thermoplastic part. The system also includes a co-consolidation system that consolidates multiple thermoplastic parts together while controlling crystallization to form a complex composite part.

Yet another embodiment is a system for co-consolidating thermoplastic parts. The system includes a die, an actuator that displaces the die to apply pressure to two separate surfaces of two separate thermoplastic parts at the same time, a heater within the die that increases a temperature of the die, and a controller that directs the actuators and the heater to co-consolidate the two separate thermoplastic parts into an integral thermoplastic part via application of heat and pressure.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together form a laminate. Individual fibers within each layer of the laminate are aligned parallel with each other, but different layers may exhibit different fiber orientations in order to increase the strength of the resulting composite along different dimensions. The laminate may include a liquid resin that solidifies in order to harden the laminate into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may return to liquid form if it is re-heated.

Figure 1:
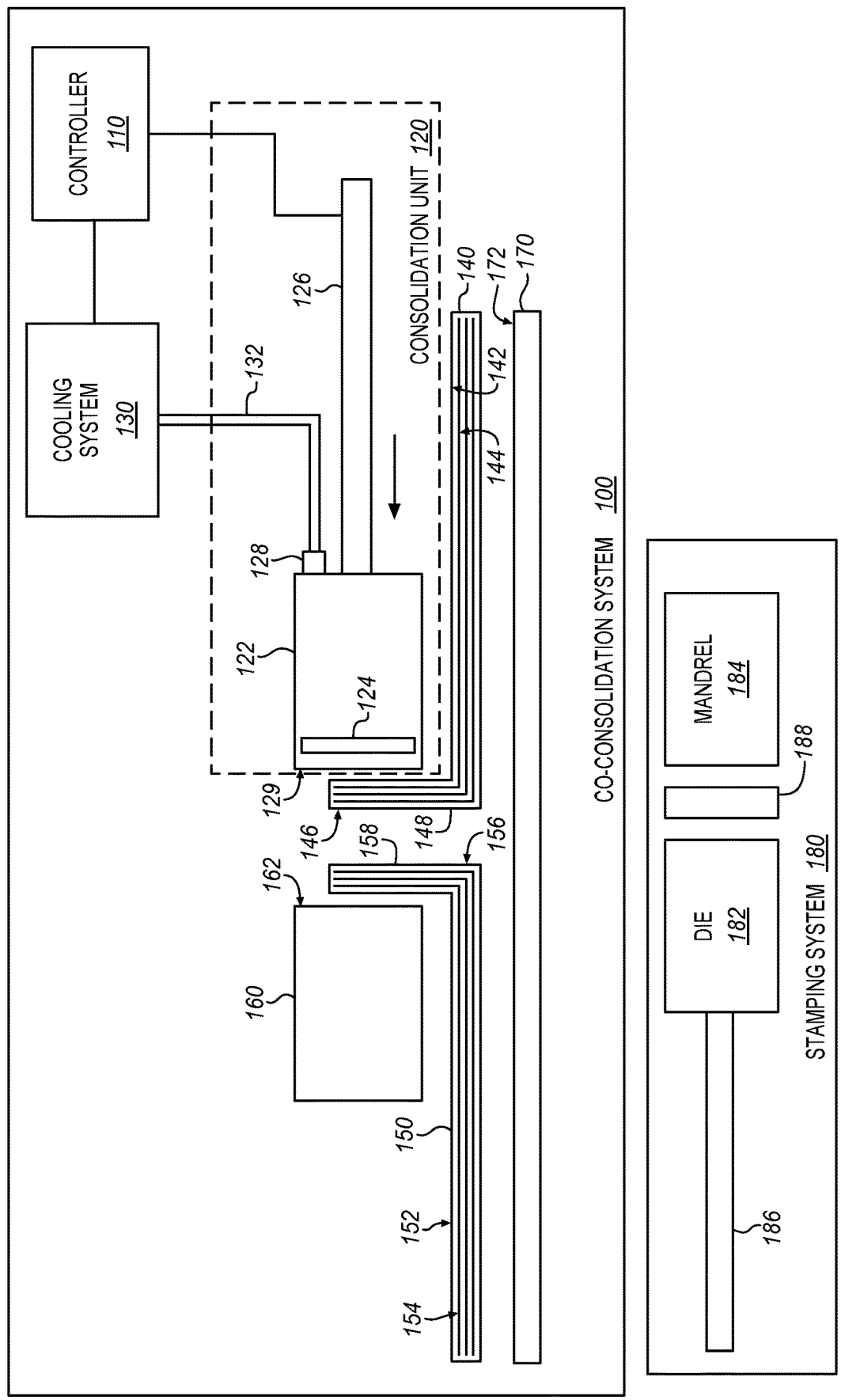
FIG. 1 is a block diagram of a co-consolidation system in an illustrative embodiment.

FIG. 1 is a block diagram of a co-consolidation system 100 in an illustrative embodiment. Co-consolidation system 100 comprises any system, device, or component operable to co-consolidate thermoplastic parts (e.g., fiber reinforced thermoplastic parts) in order to form more complex thermoplastic parts. In this embodiment, co-consolidation system 100 includes consolidation unit 120, which drives surface 129 of die 122 against first thermoplastic part 140 and second thermoplastic part 150. In one embodiment, die 122 is shaped to apply pressure to two separate composite parts while one of the composite parts is nested within another of the composite parts.

By driving the thermoplastic parts against surface 162 of mandrel 160 and surface 172 of mandrel 170 at heat and pressure, die 122 melts the resin 142 between fibers 144 and melts the resin 152 between fibers 154. Resin 142 and resin 152 may comprise any suitable thermoplastic resin, such as Polyether ether ketone (PEEK) or Polyether ketone ketone (PEKK). The melting process commingles resin proximate to the first surface 146 and second surface 156, which enables liquid resin to flow between wall 148 of first thermoplastic part 140 and wall 158 of second thermoplastic part 150. When the resin is cooled to a crystallization temperature, it will form a unified crystal structure that transforms wall 148 and wall 158 into an integral piece.

Consolidation unit 120 also includes heater 124, which heats die 122 to a melting/forming temperature (e.g., between seven hundred and nine hundred degrees Fahrenheit). Actuator 126 drives die 122 into mandrel 160, and cooling system 130 drives coolant through tubing 132 and port 128 into die 122. Cooling system 130 may rapidly cool die 122 to a crystallization temperature (e.g., three hundred and fifty degrees Fahrenheit) in less than a minute (e.g., less than thirty seconds). When the co-consolidated part is rapidly cooled to the crystallization temperature and then held at the crystallization temperature, its resin solidifies at an enhanced (e.g., reduced) dwell time when compared to continuous cooling processes. Furthermore, the processes may be performed outside of a clean room. This technology eliminates the need for an autoclave. Hence, die 122 may be positioned outside of an autoclave.

Controller 110 directs the operations of consolidation unit 120. For example, controller 110 may direct the operations of heater 124, actuator 126, and/or cooling system 130 in order to consolidate two separate thermoplastic parts into an integral thermoplastic part. Control unit 110 may be implemented, for example, as custom circuitry, as a hardware processor executing programmed instructions, or some combination thereof.

FIG. 1 also illustrates a stamping system 180, which includes die 182, mandrel 184, actuator 186 and sheet 188 of fiber reinforced thermoplastic material (e.g., one or more plies of resin and carbon fiber).

While FIG. 1 illustrates two walls being transformed into an integral piece, the systems and processes described herein may be implemented on any suitable adjacent structures such as webs, several flanges, or any combination thereof, even simultaneously.

Illustrative details of the operation of co-consolidation system 100 will be discussed with regard to FIGS. 2A-2B. Assume, for this embodiment, that a technician has formed two thermoplastic parts via stamp-forming. The technician now desires to co-consolidate the thermoplastic parts into a single integral thermoplastic part having a desired structural strength.

Figure 2A:
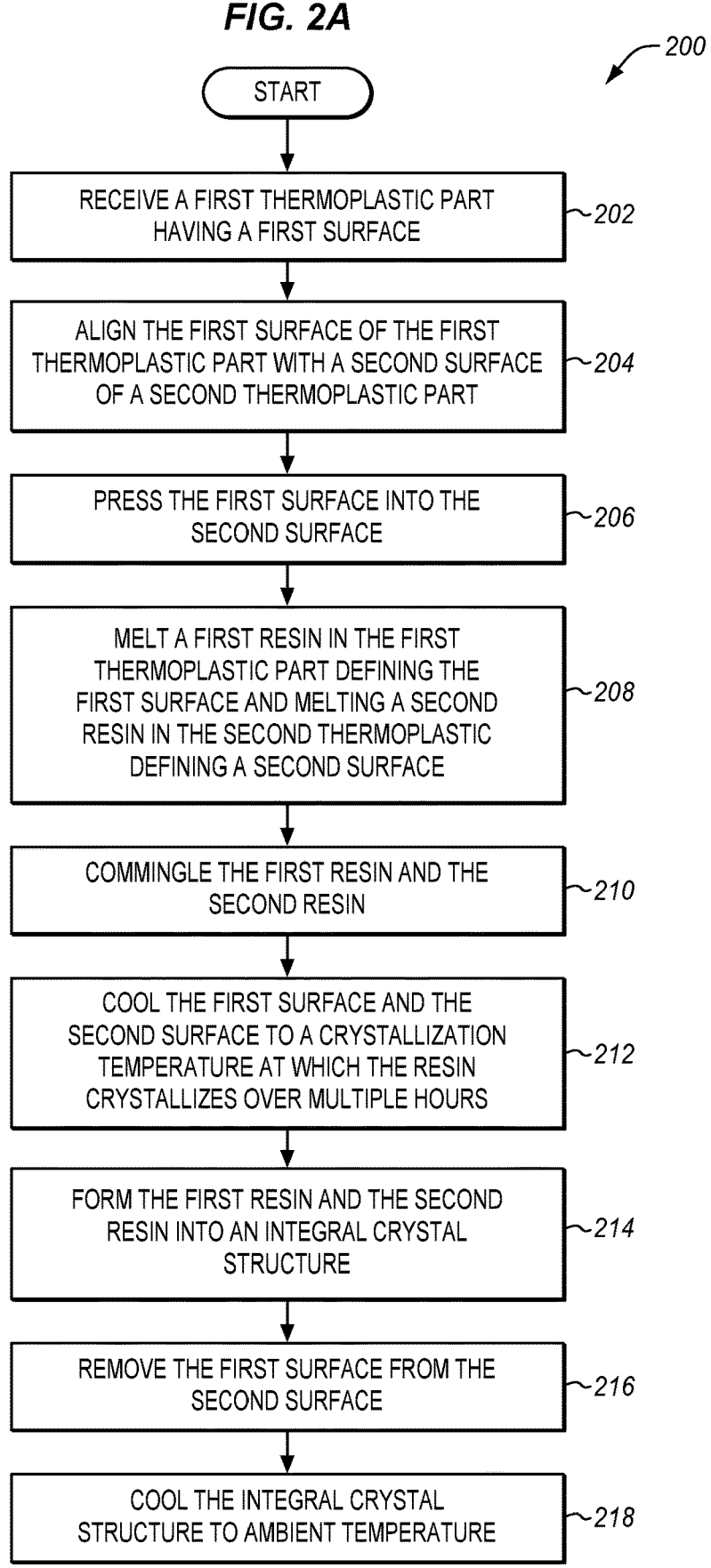
FIGS. 2A-2B are flowcharts illustrating a method for co-consolidating thermoplastic composite parts in an illustrative embodiment.

FIG. 2A is a flowchart illustrating a method 200 for co-consolidating thermoplastic parts in an illustrative embodiment. The steps of method 200 are described with reference to the co-consolidation system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, co-consolidation system 100 receives a first thermoplastic part 140 having first surface 146. For example, first thermoplastic part 140 may be placed between mandrel 160 and die 122. In step 204, the first surface 146 of the first thermoplastic part 140 is aligned with second surface 156 of second thermoplastic part 150.

Controller 110 proceeds to press the first surface 146 into the second surface 156, by directing actuator 126 to drive die 122 towards mandrel 160 (step 206). In short, actuator 126 displaces the die 122 to apply pressure to two separate surfaces of two separate thermoplastic parts at the same time;

While pressure is applied by die 122, controller 110 may further direct heater 124 to increase a temperature of die 122 to a melting temperature or processing temperature of resin 142 and resin 152 (e.g., seven hundred degrees Fahrenheit). This melts the resin 142 and resin 152 which define first surface 146 of first thermoplastic part 140 and second surface 156 of second thermoplastic part 150 (step 208). The combination of pressing and melting causes resin 142 and resin 152 to commingle (step 210).

After resin between the thermoplastic parts has been melted and pressed together at the melting temperature, controller 110 directs cooling system 130 to pump a cooling fluid through die 122 in order to reduce a temperature of die 122 to a crystallization temperature (e.g., three hundred and fifty degrees Fahrenheit). This cools first surface 146 of first thermoplastic part 140 and second surface 156 of second thermoplastic part 150 to the crystallization temperature (step 212). At the crystallization temperature, the resin within the thermoplastic parts crystallizes over a period of multiple hours. Resin 142 and resin 152 proceed to form into an integral crystal structure. Because the integral crystal structure is formed at the crystallization temperature, the crystal formation process takes longer and the integral crystal structure has a larger grain size than if it were formed at room temperature. This also ensures that the thermoplastic parts unify into an integral composite part (step 214).

In step 216, controller 110 removes the first surface 146 from the second surface 156, by directing actuator 126 to stop applying force to die 122. The integral thermoplastic part may then be removed from between die 122 and mandrel 160, and the integral crystal structure may be cooled to ambient temperature (e.g., by placing it in a room temperature location) (step 218).

Method 200 provides a benefit over prior techniques for forming complex thermoplastic parts, because it allows for complex composite parts to be formed by stamp-forming simple composite parts (e.g., from flat or sheet material), and then co-consolidating those simple composite parts into complex composite parts. This eliminates the need for complicated tooling, and reduces the degree of technician expertise needed during the fabrication process.

Figure 2B:
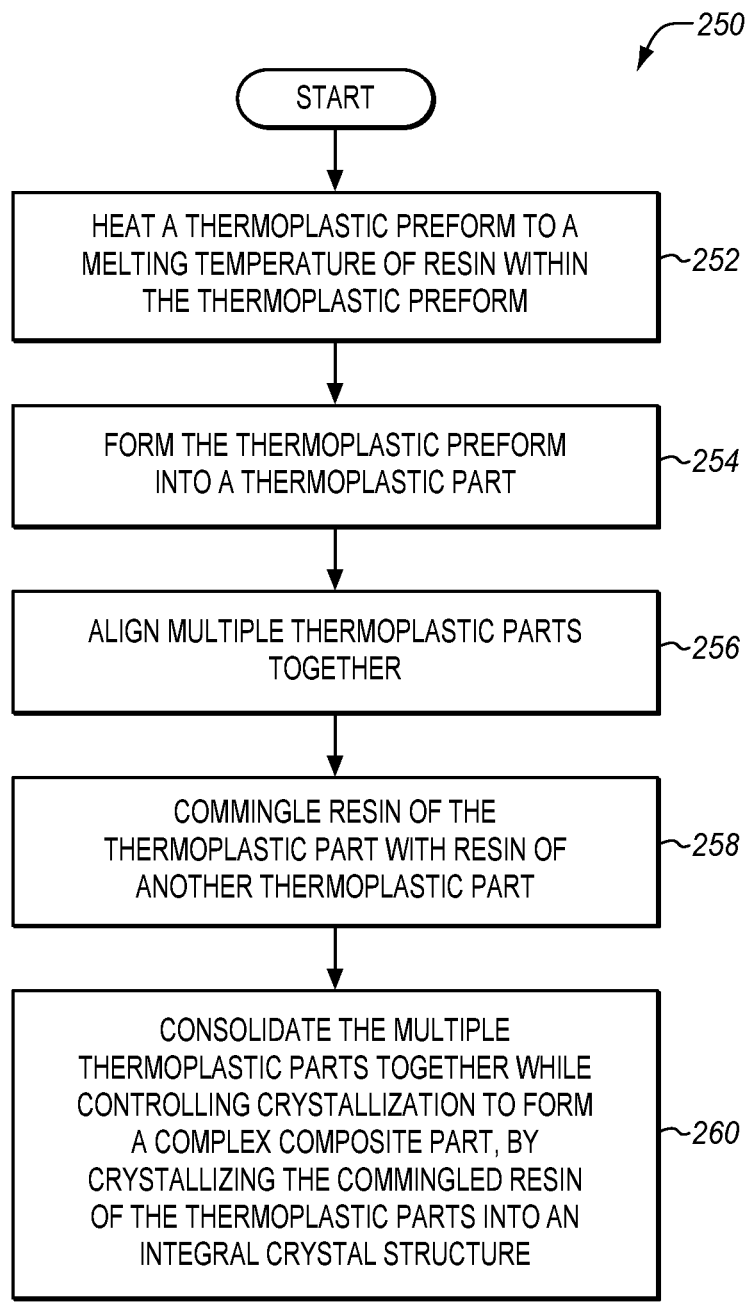

FIG. 2B is a further flowchart illustrating a method 250 for co-consolidating thermoplastic composite parts in an illustrative embodiment. Specifically, FIG. 2B describes a high-level method for co-consolidation of thermoplastic parts (including fiber reinforced thermoplastic parts) via stamp forming. For example, die 182 may stamp the sheet into a shape that includes a web and at least one wall. According to method 250, step 252 includes heating a thermoplastic material (e.g., thermoplastic preform 400 of FIG. 4) to a melting temperature of a resin within the thermoplastic material. In step 254, the thermoplastic material is stamp-formed into a thermoplastic part having a desired shape (e.g., by applying pressure while the resin is melted). In step 256, multiple thermoplastic parts (including the thermoplastic part formed in steps 252-254) are aligned together. Step 258 comprises commingling resin of the thermoplastic part with resin of another thermoplastic part (e.g., while resin at both parts is melted), and step 260 includes consolidating the thermoplastic parts together while controlling crystallization to form a complex composite part, by crystallizing the commingled resin of the thermoplastic parts into an integral crystal structure. Method 250 provides a substantial benefit by allowing stamp forming techniques to be utilized for forming more complex thermoplastic composite parts.

Figure 3:
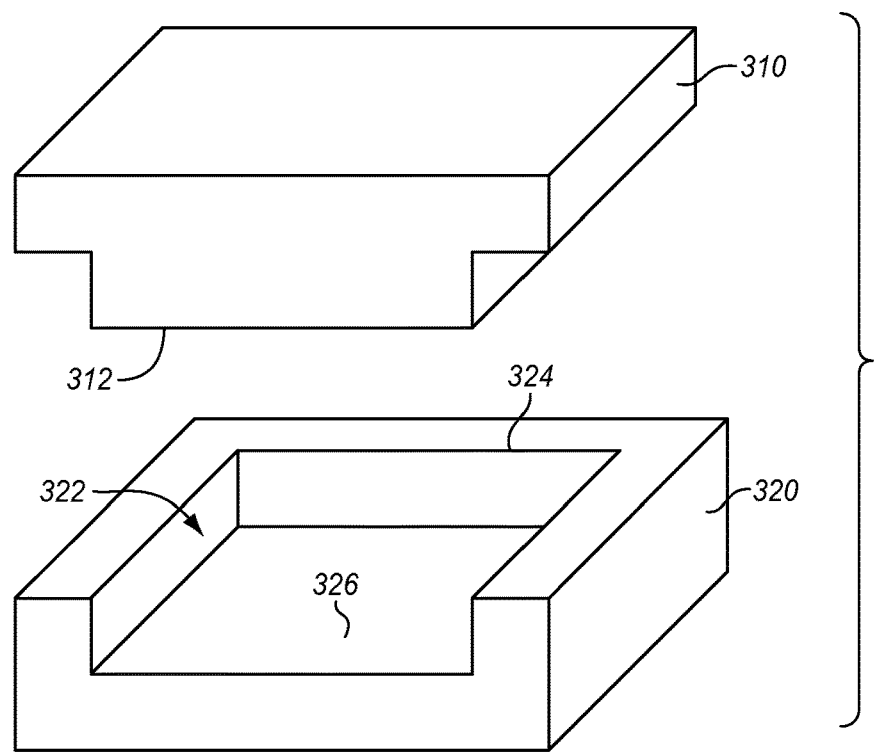
FIGS. 3-6 are diagrams illustrating fabrication of a thermoplastic composite part having an integral crystal structure, formed from two separate thermoplastic parts in an illustrative embodiment.
Figure 4:
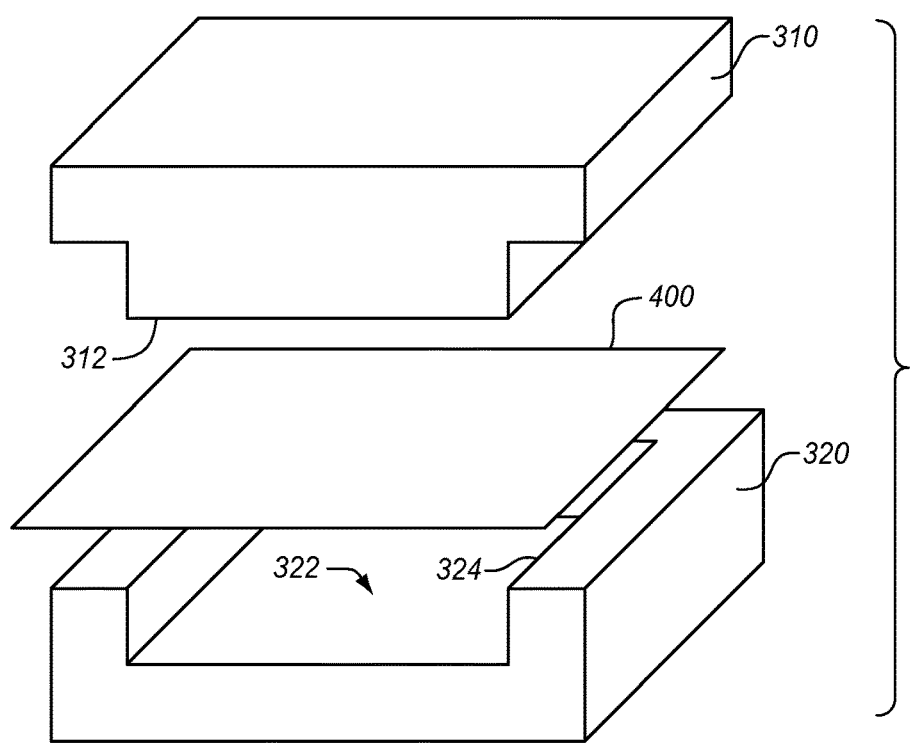
Figure 5:
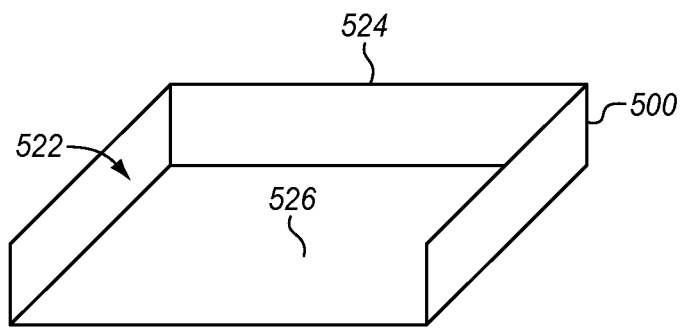

FIGS. 3-6 are diagrams illustrating fabrication of a thermoplastic composite part having an integral crystal structure, formed from two separate thermoplastic parts in an illustrative embodiment. As shown in FIG. 3, a die 310 includes a projection 312 which mates with a recess 326 at a mandrel 320. The recess 326 and walls 324 define a compartment 322 into which projection 312 is pressed. In one embodiment, a wall (not shown for clarity) opposite to wall 324 of mandrel 320 is located on die 310, and may press against wall 324 during the forming process. FIG. 4 illustrates that a thermoplastic preform 400 (e.g., a flat vendor-supplied sheet of carbon fiber reinforced thermoplastic) has been placed between die 310 and mandrel 320. In FIG. 5, a thermoplastic part 500 has been fabricated by die 310 and mandrel 320. Thermoplastic part 500 includes web 526 and one or more walls 524. The combination of web 526 and walls 524 forms compartment 522. Furthermore, at least one of walls 524 has been dimensioned for co-consolidation with another wall of another composite part, in order to form a complex composite part (e.g., a complex thermoplastic composite structure) having an integral crystal structure. For example, another thermoplastic part (not shown for clarity) similar in shape to thermoplastic part 500 may be placed against thermoplastic part 500 for co-consolidation with thermoplastic part 500.

Figure 6:
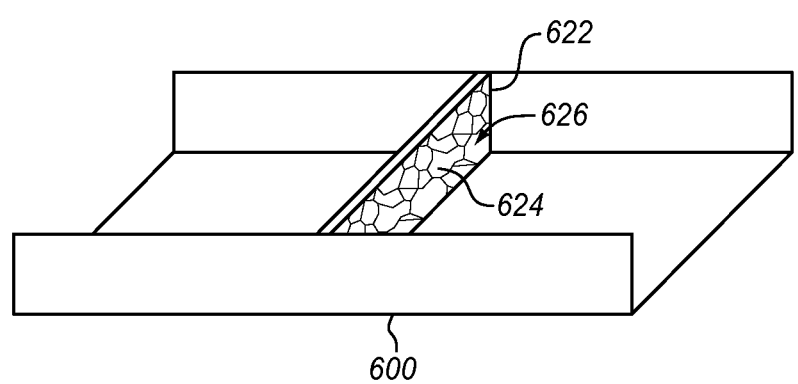

FIG. 6 is a diagram illustrating co-consolidation of multiple thermoplastic composite parts into a unified thermoplastic part 600 in an illustrative embodiment. In FIG. 6, wall 524 of thermoplastic part 500 has been co-consolidated with a wall of another thermoplastic part (not shown) and processed at a crystallization temperature to form a unified thermoplastic part 600 having a more complex geometry. As shown in FIG. 6, unified thermoplastic part 600 includes wall 622, which includes an integral crystal structure 624 having grains 626. While FIG. 6 illustrates two walls adjoined into one, similar processes may work on other adjacently joined structures, such as webs or even several flanges and webs simultaneously.

FIGS. 7-14 are diagrams illustrating co-consolidation of multiple thermoplastic parts to form a rib for an aircraft in an illustrative embodiment. Specifically, these FIGS. Illustrate how five composite parts may be nested together to form a rib having a desired level of structural strength and geometric complexity. These techniques may be used to join fiber reinforced thermoplastic parts, such as thermoplastic parts that include different numbers of plies. These techniques may be used to join webs and any desired perimeter flanges, such as via the manner described with regard to FIGS. 1-2 and 6.

Figure 7:
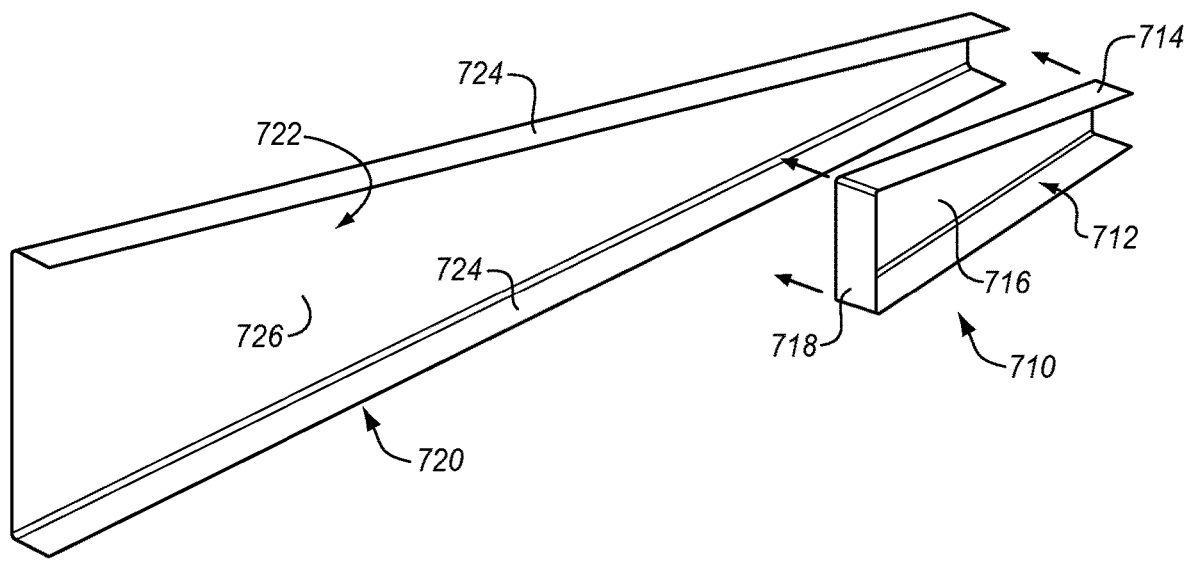
FIGS. 7-14 are diagrams illustrating co-consolidation of multiple thermoplastic parts to form a rib for an aircraft in an illustrative embodiment.
Figure 8:
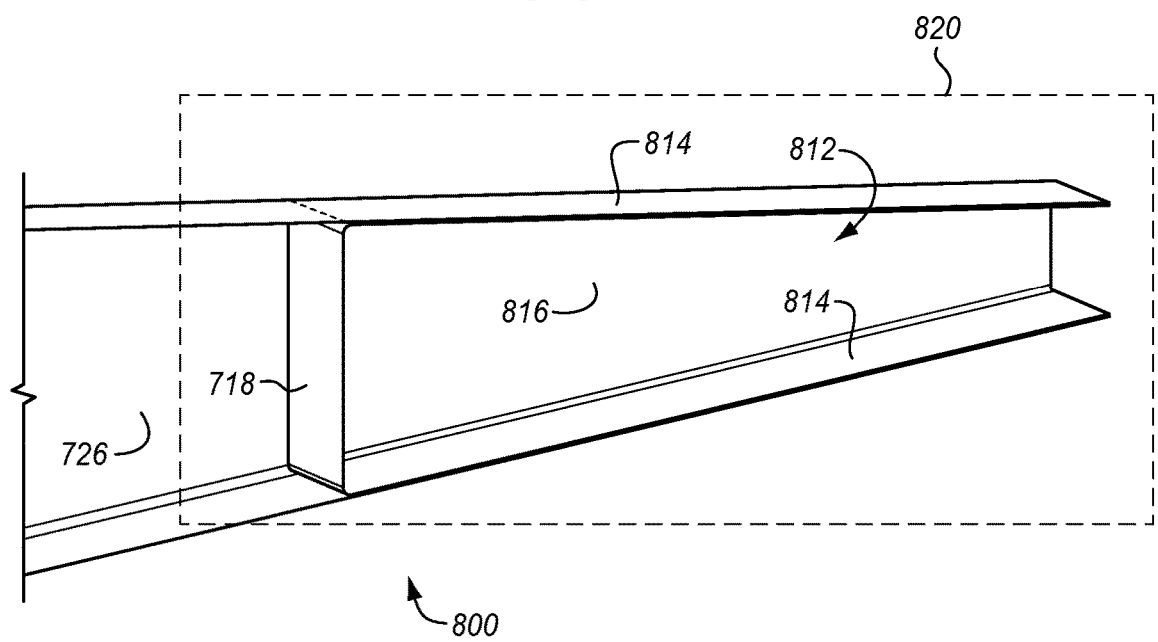

In FIG. 7, composite part 710 is aligned for nesting within composite part 720. Composite part 710 includes web 716, from which flanges 714 and wall 718 project. Together, these elements define compartment 712. Composite part 720 includes web 726 and flanges 724 which define compartment 722. Composite part 710 is nested within compartment 722 of composite part 720. In FIG. 8, thermoplastic part 710 has been made integral with composite part 720 via the application of heat and pressure via method 200 of FIG. 2, resulting in thermoplastic part 800. As shown in region 820, thermoplastic part 800 includes flanges 814, which include plies/material from flanges 714 and flanges 724. Thermoplastic part 800 also includes wall 718, and web 816. Web 816 includes plies/material from web 716 and web 726. Flanges 814 and wall 718 define compartment 812. In further embodiments, composite part 710 may be nested within composite part 720 at the same time that other thermoplastic parts are nested (e.g., adjacent to or within composite part 710).

Figure 9:
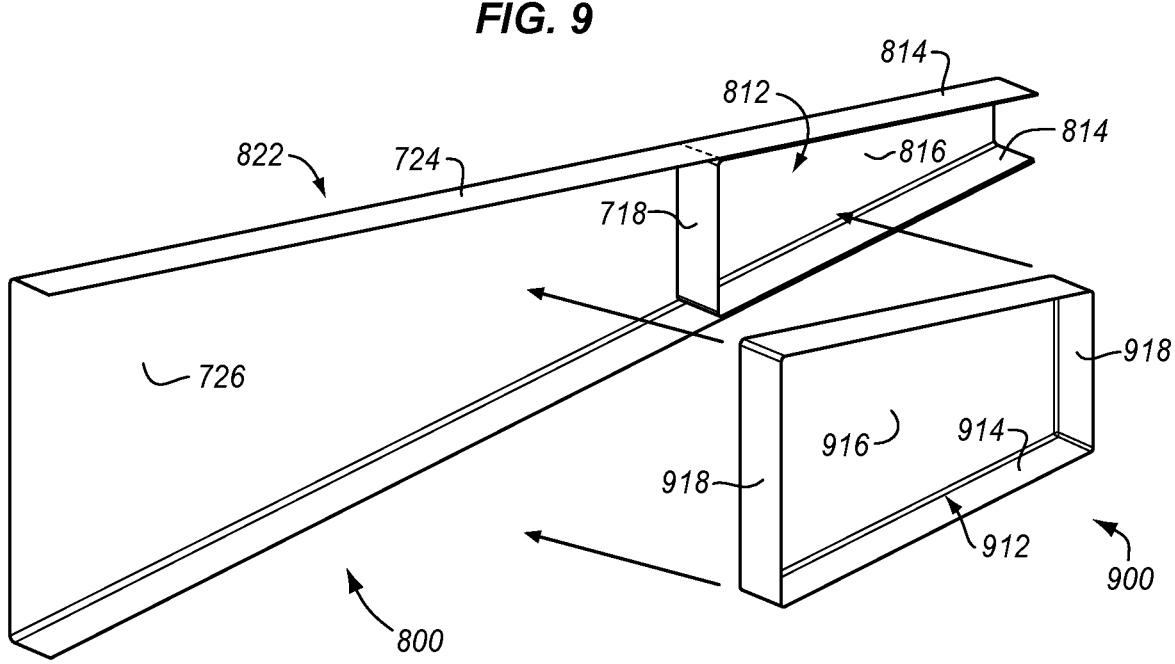
Figure 10:
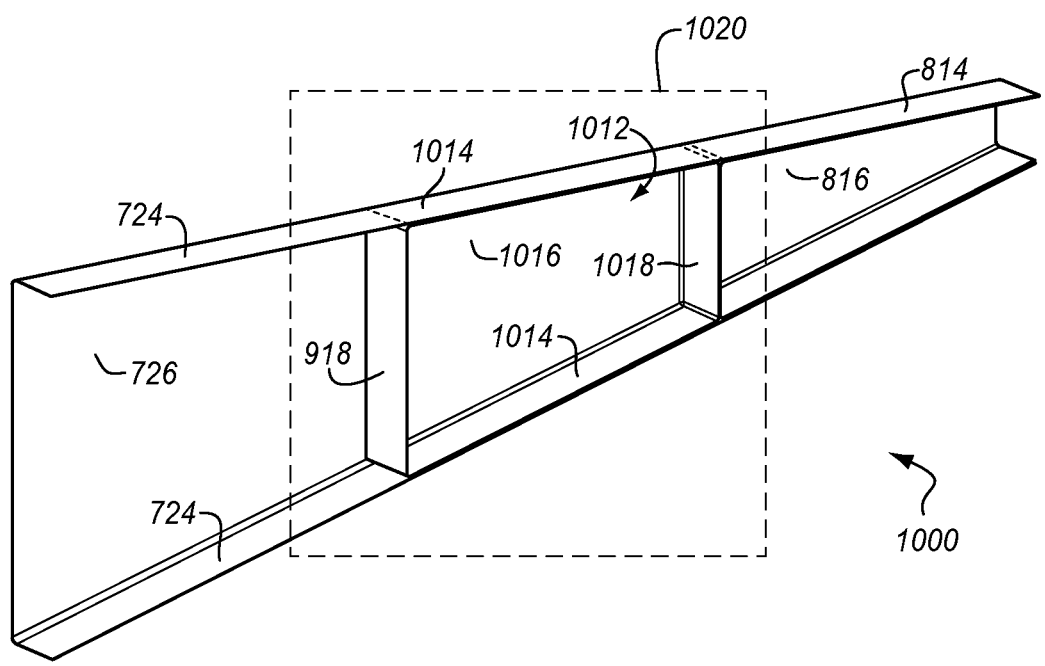

In FIG. 9, thermoplastic part 900 is aligned for nesting within thermoplastic part 800. In this view, it can be seen that a portion of flanges 724 and web 726 remain at thermoplastic part 800. Flanges 724 and web 726 are thinner than flanges 814 and web 816, because no thermoplastic material has been added to these features. As shown in FIG. 9, thermoplastic part 900 includes compartment 912, which is defined by walls 918, flanges 914, and web 916. When thermoplastic part 900 is moved in the direction indicated by the arrows of FIG. 9 and co-consolidated with thermoplastic part 800 via heat and pressure, it forms an integral crystal structure with thermoplastic part 800, resulting in thermoplastic part 1000 of FIG. 10. As shown in FIG. 10 at region 1020, thermoplastic part 1000 includes compartment 1012, which is defined by web 1016, wall 918, wall 1018 and flanges 1014. Flanges 1014 include material from flanges 914 and flanges 724, wall 1018 includes material from a wall 918 and wall 718, and web 1016 includes material from web 72 and web 916.

Figure 11:
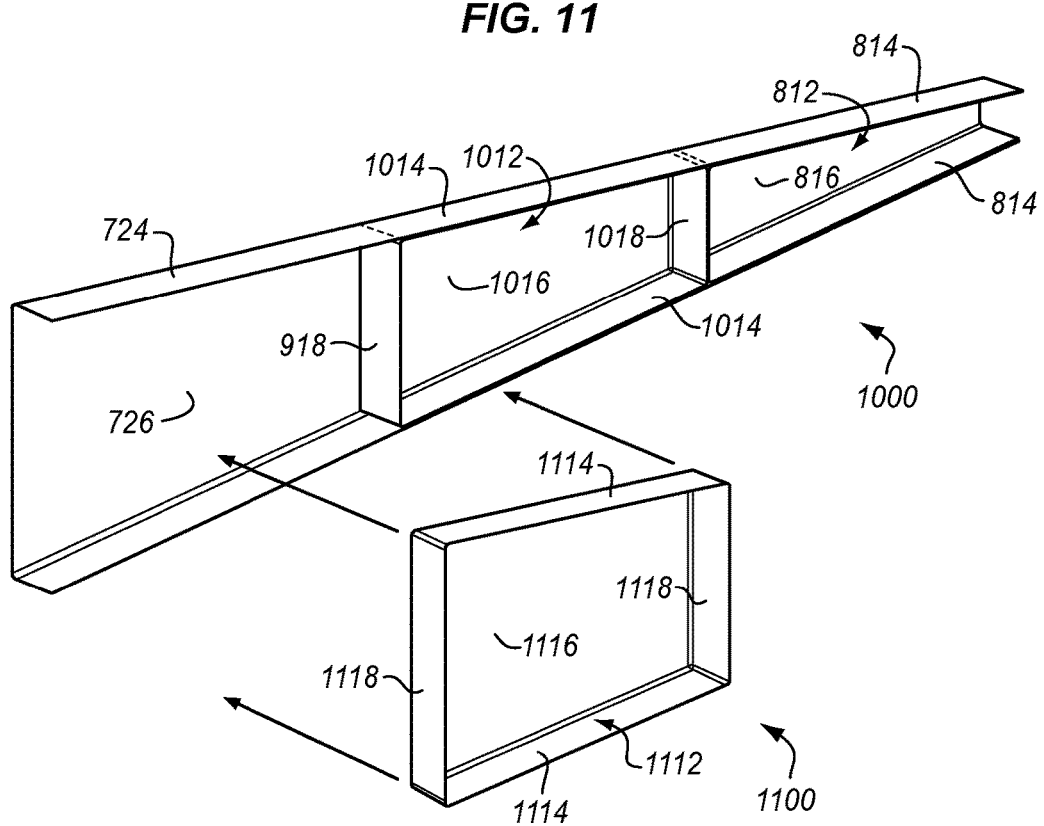
Figure 12:
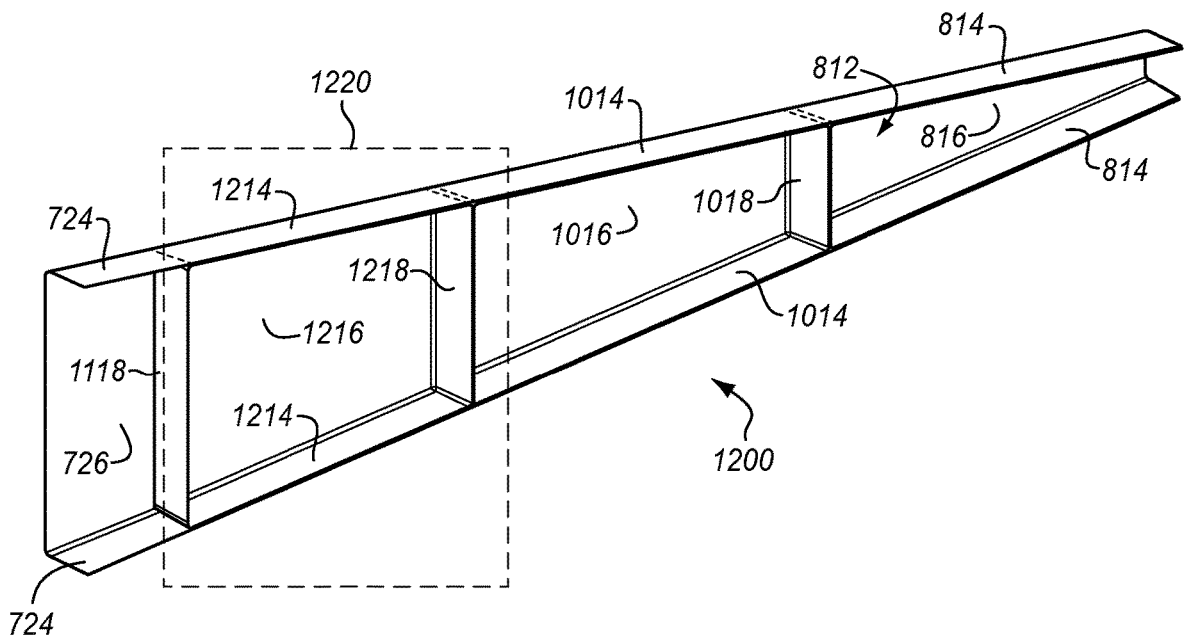

In FIG. 11, thermoplastic part 1100 is aligned for nesting within thermoplastic part 1000. Thermoplastic part 1100 includes web 1116, walls 1118, and flanges 1114 which define compartment 1112. When thermoplastic part 1100 is moved in the direction indicated by the arrows of FIG. 11 and co-consolidated with thermoplastic part 1000 via heat and pressure, it forms an integral crystal structure with thermoplastic part 1000, resulting in thermoplastic part 1200 of FIG. 12. As shown in region 1220, thermoplastic part 1200 includes wall 1218, wall 1118, flanges 1214, and web 1216. Wall 1218 includes material from wall 918 and wall 1118, flanges 1214 include material from flanges 724 and flanges 1114, and web 1216 includes material from web 726 and web 1116.

Figure 13:
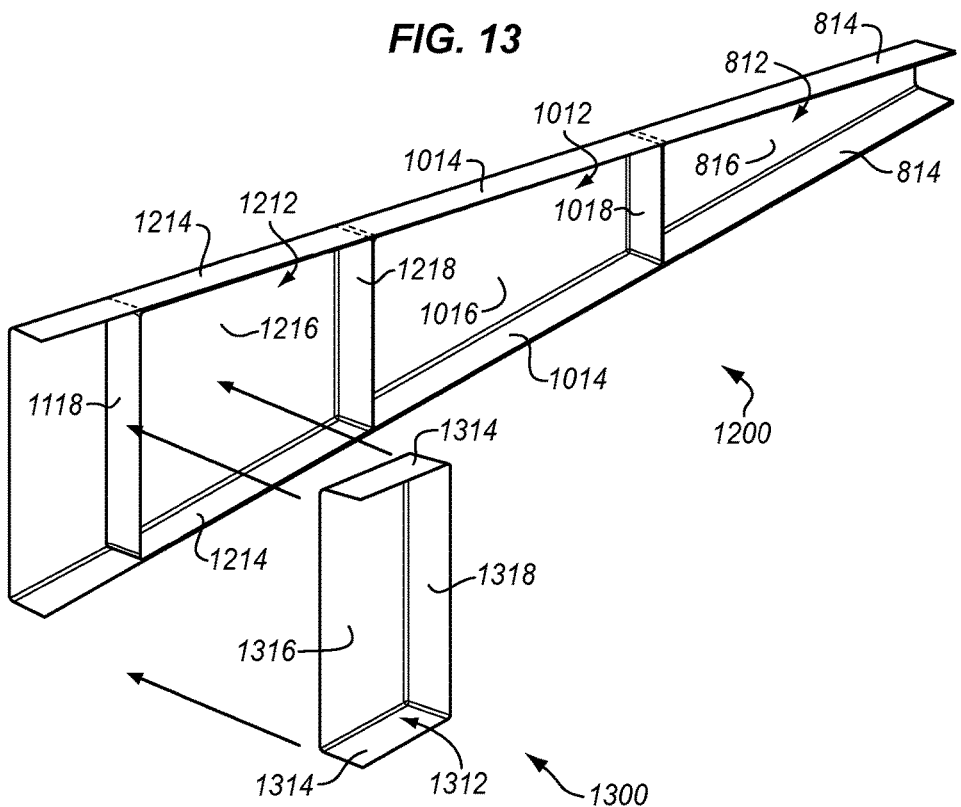

In FIG. 13, thermoplastic part 1300 is aligned for nesting within thermoplastic part 1200. Thermoplastic part 1300 includes web 1316, wall 1318, and flanges 1314 which define compartment 1312. When thermoplastic part 1300 is moved in the direction indicated by the arrows of FIG. 13 and co-consolidated with thermoplastic part 1200 via heat and pressure, it forms an integral crystal structure with thermoplastic part 1000, resulting in thermoplastic part 1400 of FIG. 14. As shown in region 1420, thermoplastic part 1400 includes wall 1418, flanges 1414, and web 1416. Wall 1418 includes material from wall 1118 and wall 1318, flanges 1414 include material from flanges 724 and flanges 1314, and web 1416 includes material from web 726 and web 1316.

Figure 14:
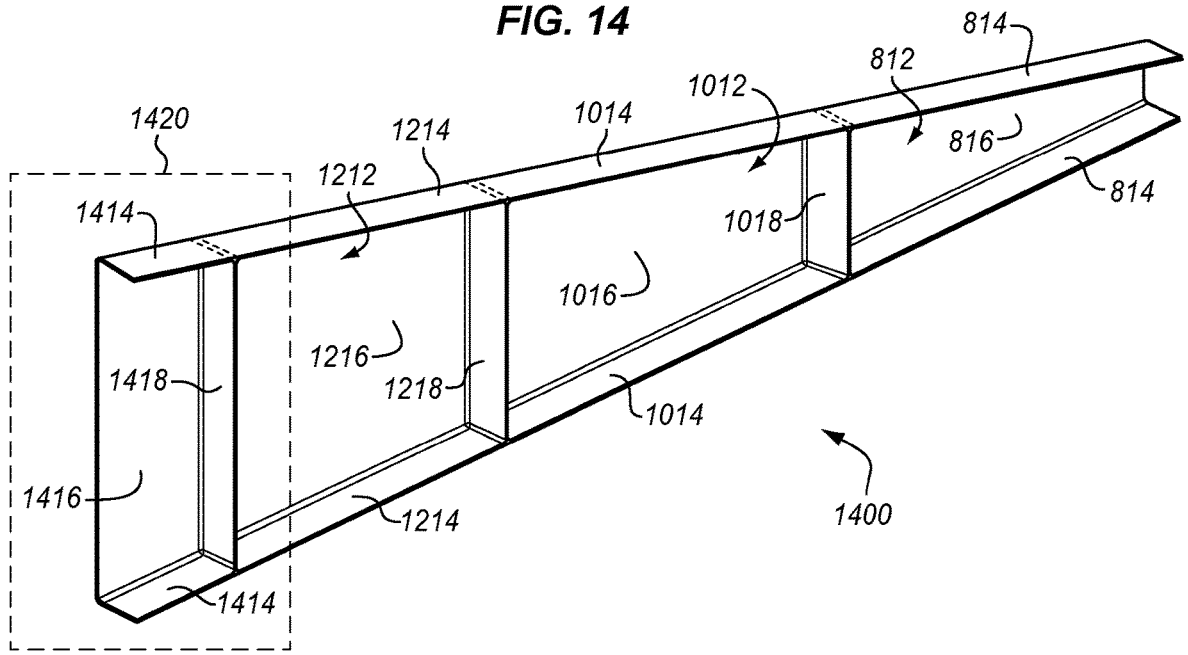

While FIG. 14 does not illustrate flanges placed at the edges/sides of thermoplastic part 1400, an actual rib may include such flanges for bolting/affixing a spar onto either end. Furthermore, other structures, such as spars, frames, intercostals, etc. may be formed via the processes described above.

Figure 15:
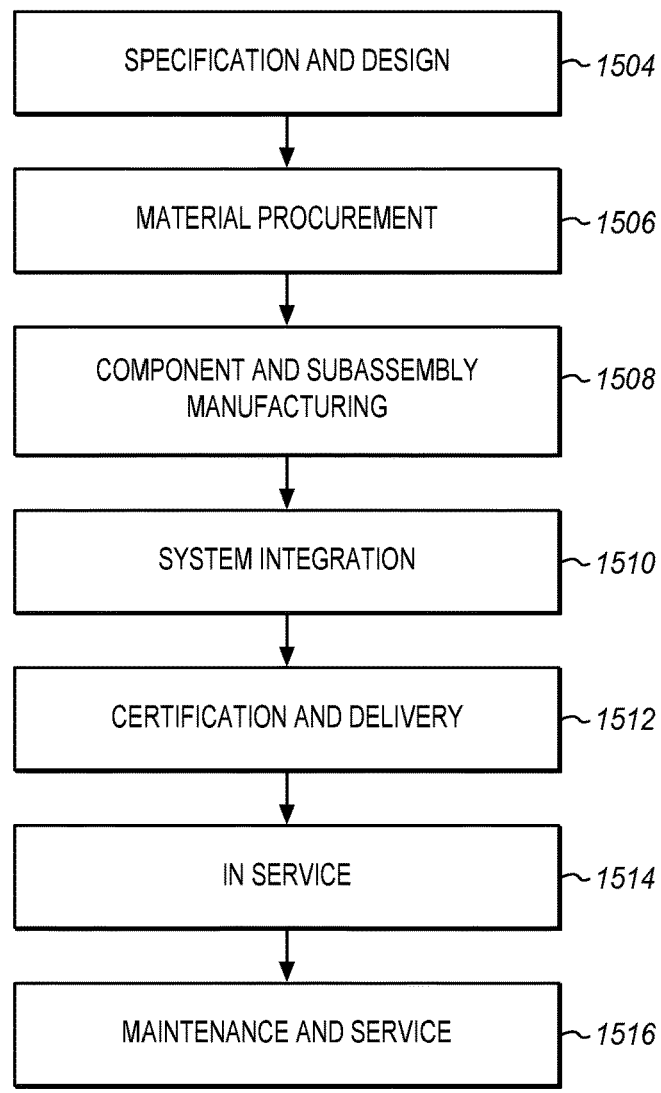
FIG. 15 is a flow diagram of aircraft production and service methodology in an illustrative embodiment.
Figure 16:
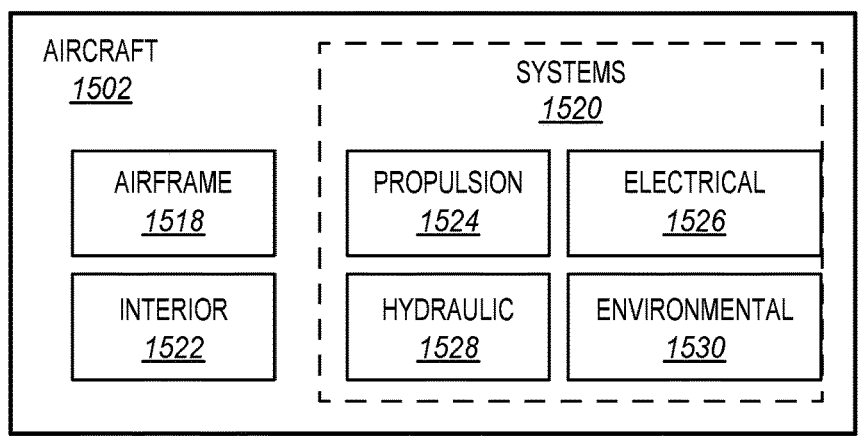
FIG. 16 is a block diagram of an aircraft in an illustrative embodiment.

Referring more particularly to the drawings, embodiments of the disclosure may be described in the context of aircraft manufacturing and service in method 1500 as shown in FIG. 15 and an aircraft 1502 as shown in FIG. 16. During pre-production, method 1500 may include specification and design 1504 of the aircraft 1502 and material procurement 1506. During production, component and subassembly manufacturing 1508 and system integration 1510 of the aircraft 1502 takes place. Thereafter, the aircraft 1502 may go through certification and delivery 1512 in order to be placed in service 1514. While in service by a customer, the aircraft 1502 is scheduled for routine work in maintenance and service 1516 (which may also include modification, reconfiguration, refurbishment, and so on). Apparatus and methods embodied herein may be employed during any one or more suitable stages of the production and service described in method 1500 (e.g., specification and design 1504, material procurement 1506, component and subassembly manufacturing 1508, system integration 1510, certification and delivery 1512, service 1514, maintenance and service 1516) and/or any suitable component of aircraft 1502 (e.g., airframe 1518, systems 1520, interior 1522, propulsion system 1524, electrical system 1526, hydraulic system 1528, environmental 1530).

Each of the processes of method 1500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 16, the aircraft 1502 produced by method 1500 may include an airframe 1518 with a plurality of systems 1520 and an interior 1522. Examples of systems 1520 include one or more of a propulsion system 1524, an electrical system 1526, a hydraulic system 1528, and an environmental system 1530. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1500. For example, components or subassemblies corresponding to component and subassembly manufacturing 1508 may be fabricated or manufactured in a manner similar to components or subassemblies produced while the aircraft 1502 is in service. Also, one or more apparatus embodiments, method embodiments, or a combination thereof may be utilized during the subassembly manufacturing 1508 and system integration 1510, for example, by substantially expediting assembly of or reducing the cost of an aircraft 1502. Similarly, one or more of apparatus embodiments, method embodiments, or a combination thereof may be utilized while the aircraft 1502 is in service, for example and without limitation during the maintenance and service 1516. For example, the techniques and systems described herein may be used for material procurement 1506, component and subassembly manufacturing 1508, system integration 1510, service 1514, and/or maintenance and service 1516, and/or may be used for airframe 1518 and/or interior 1522. These techniques and systems may even be utilized for systems 1520, including, for example, propulsion system 1524, electrical system 1526, hydraulic 1528, and/or environmental system 1530.

In one embodiment, a part comprises a portion of airframe 1518, and is manufactured during component and subassembly manufacturing 1508. The part may then be assembled into an aircraft in system integration 1510, and then be utilized in service 1514 until wear renders the part unusable. Then, in maintenance and service 1516, the part may be discarded and replaced with a newly manufactured part. Inventive components and methods may be utilized throughout component and subassembly manufacturing 1508 in order to co-consolidate thermoplastic parts into more complex thermoplastic parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method of automatically forming a thermoplastic composite structure, the method comprising:
heating a thermoplastic preform to a melting temperature of a resin within the thermoplastic preform;
forming the thermoplastic preform into a thermoplastic part having a desired shape;
aligning multiple thermoplastic parts together;
stamping at least one of the multiple thermoplastic parts into a shape via a die;
cooling the die while the die contacts at least one of the multiple thermoplastic parts to a crystallization temperature that is lower than the melting temperature and higher than an ambient temperature within less than one minute; and
consolidating the multiple thermoplastic parts together while controlling crystallization by holding the multiple thermoplastic parts at the crystallization temperature to form a complex thermoplastic part.

2. The method of claim 1 wherein:
consolidating comprises crystallizing commingled resin of the thermoplastic parts into an integral crystal structure.

3. The method of claim 1 wherein:
the thermoplastic parts comprise fiber reinforced thermoplastic parts.

4. The method of claim 1 wherein:
forming the thermoplastic preform comprises stamping the thermoplastic preform.

5. The method of claim 1 wherein:
consolidating comprises compressing the multiple thermoplastic parts together between the die and a mandrel.

6. The method of claim 5 wherein:
cooling the die is performed for a time period between thirty seconds and one minute.

7. The method of claim 1 wherein:
the crystallization temperature is three hundred and fifty degrees Fahrenheit.

8. The method of claim 1 wherein:
cooling the die is performed within less than thirty seconds.

9. The method of claim 1 wherein:
cooling the die comprises driving coolant into the die.

10. The method of claim 1 further comprising:
maintaining the die at the crystallization temperature for multiple hours.

11. The method of claim 1 wherein:
prior to the cooling, the die melts resin between fibers of the multiple thermoplastic parts.

12. The method of claim 1 wherein:
heating comprises activating a heater within the die.

13. The method of claim 1 further comprising:
driving the die to mate a projection of the die with a recess of a mandrel that receives at least one of the multiple thermoplastic parts.

14. The method of claim 1 wherein:
heating the thermoplastic preform comprises increasing a temperature of the thermoplastic preform to between seven hundred and nine hundred degrees Fahrenheit.

15. The method of claim 1 further comprising:
operating the die to stamp a thermoplastic preform in the form of a sheet.

16. The method of claim 1 wherein:
consolidating the multiple thermoplastic parts comprises operating an actuator that applies pressure to the multiple thermoplastic parts.

17. The method of claim 1 wherein:
the shape includes a web and at least one wall.

18. The method of claim 1 wherein:
aligning the multiple thermoplastic parts together comprising nesting one of the multiple thermoplastic parts within another of the multiple thermoplastic parts.

19. The method of claim 1 wherein:
the complex thermoplastic part comprises a rib for an aircraft.

20. The method of claim 1 wherein:
consolidating the multiple thermoplastic parts together comprises consolidating flanges of the multiple thermoplastic parts.

* * * * *